United States Patent [19]

Baumann et al.

[11] 4,335,441

[45] Jun. 15, 1982

[54] ELECTRONICALLY CONTROLLED INDICATOR AND TESTING DEVICE FOR FRANKING MACHINES

[75] Inventors: Kurt Baumann; Peter Kusche, both of Berlin; Reinhard Redecker, Bielefeld, all of Fed. Rep. of Germany

[73] Assignee: Postalia GmbH, Offenbach am Main, Fed. Rep. of Germany

[21] Appl. No.: 144,336

[22] Filed: Apr. 28, 1980

[30] Foreign Application Priority Data

Apr. 26, 1979 [DE] Fed. Rep. of Germany ....... 2916811

[51] Int. Cl.[3] ........................ G06F 15/20

[52] U.S. Cl. ........................ 364/580; 364/464

[58] Field of Search ............... 364/464, 466, 580, 200, 364/900; 235/61.9 A

[56] References Cited

U.S. PATENT DOCUMENTS

| | | | |
|---|---|---|---|
| 3,624,617 | 11/1971 | Putterman et al. | 361/92 X |
| 3,635,297 | 1/1972 | Salava | 364/464 X |
| 3,757,917 | 9/1973 | Waiwood et al. | 194/10 |
| 3,792,446 | 2/1974 | McFiggins et al. | 364/900 |
| 3,810,116 | 5/1974 | Prohofsky | 364/200 |
| 4,021,645 | 5/1977 | Saufferer et al. | 371/25 X |
| 4,024,380 | 5/1977 | Gunn | 177/5 X |
| 4,180,856 | 12/1979 | Check, Jr. et al. | 364/466 |
| 4,251,874 | 2/1981 | Check, Jr. | 364/466 X |

*Primary Examiner*—Edward J. Wise

*Attorney, Agent, or Firm*—Herbert L. Lerner; Laurence A. Greenberg

[57] ABSTRACT

Electronically controlled indicator and testing device for the denominational printing of franking machines, including a numerical display, a microprocessor for setting values or assigned characteristics in the numerical display, a device for sequentially visualizing all numerals in the numerical display after the franking machine is turned on, a program memory, a main memory, a data memory, and an exchangeable memory each connected to the microprocessor, a printing mechanism, a selectable option printing drum, an electro-mechanical device cooperating with the microprocessor for setting denominations in the printing mechanism and option printing drum, an electronic setting tester independent of the electro-mechanical device for comparing set values in the printing mechanism and option printing drum with the set values or assigned characteristics in the numerical display and for releasing an option print only if the set values agree, a key for triggering an additional run of all numerals of the numerical display at any time and for sequentially reproducing the set values on the numerical display in selectable order.

4 Claims, 1 Drawing Figure

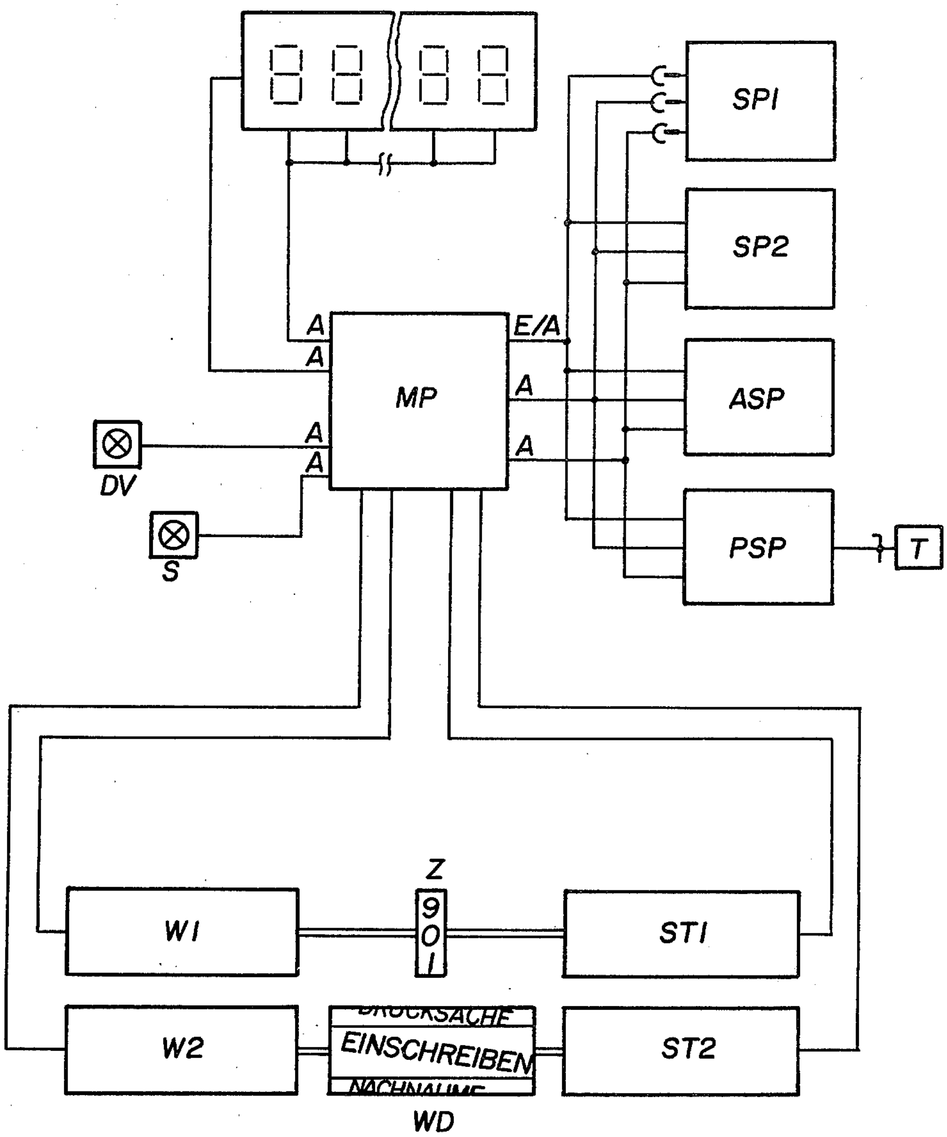
SP1
SP2
ASP
PSP
T
MP
E/A
A
A
A
A
A
A
A
DV
S
Z
9
0
1
W1
ST1
W2
ST2
DRUCKSACHE
EINSCHREIBEN
NACHNAHME
WD

ELECTRONICALLY CONTROLLED INDICATOR AND TESTING DEVICE FOR FRANKING MACHINES

The invention relates to an electronically controlled indicator and testing device for the denominational printing of franking machines, preferably for a postage metering and/or stamping machine for printing a postage value on a document, a piece of mail or a strip.

The indicating devices of postage metering and/or stamping machines have several counters, depending on the requirement and the necessary or desired level of expenditure. Thus, for instance, a postage counter, a piece counter, a control counter, a "value card" counter and others. If required, numbers of different sizes may be used for the individual counters, in order to emphasize certain values, for instance, the postage. Since such franking machines are used for accounting purposes, a clear indication must be ensured, and possible defects of the control of the indicator device must be reported; through suitable optical and/or accoustical signals.

It must further be ensured that the values appearing on the indicator agree with the values set at the denominational printer and are recognized and signalled in the case of deviations, or the printing of the postage is inhibited. In conventional devices, however, these requirements are not adequately met.

It is accordingly an object of the invention to provide an electronically controlled indicator and testing device for franking machines which overcomes the hereinafore-mentioned disadvantages of the heretofore-known devices of this general type, and which takes the abovementioned criteria into consideration.

With the foregoing and other objects in view there is provided, in accordance with the invention, an electronically controlled indicator and testing device for the denominational printing of franking machines, preferably for a postage metering and/or stamping machine for printing a postage value on a document, a piece of mail or a strip, comprising a numerical display, a microprocessor for setting values or assigned charecteristics in said numerical display, means for sequentially visualizing all numerals in the numerical display after the franking machine is turned on, a program memory, a main memory, a data memory, and an exchangeable memory each connected to the microprocessor, a printing mechanism, a selectable option printing drum, electro-mechanical means cooperating with the microprocessor for setting denominations in the printing mechanism and option printing drum, electronic setting test means independent of the electro-mechanical means for comparing set values in the printing mechanism and option printing drum with the set value or assigned characteristics in the numerical display and for releasing an option print only if the set values agree, and key means for triggering an additional run of all numerals of the numerical display at any time and for sequentially reproducing the set values on the numerical display in selectable order.

In accordance with another feature of the invention, there is provided at least one additional numerical display disposed adjacent the first-mentioned numerical display for displaying several set values simultaneously with the first-mentioned numerical display.

In accordance with a further feature of the invention, the brightness of the numerical displays are automatically adapted to the brightness of the surroundings.

In accordance with a concomitant feature of the invention, there is provided a printing interlock, a signal for indicating exceeding of a preset number of prints in a given time period, and a print inhibitor, and wherein the exchangeable memory includes data on mechanical wear and rate limits and means for activating at least one of the printing interlock, signal and print inhibitor in the event of disagreement of the data with data stored in the data memory.

Other features which are considered as characteristic for the invention are set forth in the appended claims.

Although the invention is illustrated and described herein as embodied in an electronically controlled indicator and testing device for franking machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing which is a block-circuit diagram of the invention.

Referring now to the single FIGURE of the drawing, it is understood that known dot matrix indicators still allow a correct reading of the indication if individual luminous spot dots fail, but have the disadvantage of a large current drain and require an additional decoder. For this reason, a seven-segment display, such as is shown at the top of the drawing, is preferred for the numerical display of the indicator and testing device. The fragmentary numerical display illustrated in the drawing represents either one display or a plurality of displays for simultaneously displaying values.

A simple test procedure is provided for the seven-segment display. To check the indication and determine individual defects, all numerals from zero to nine of each digit are sequentially displayed after the franking machine is switched on. Any possible type of indication defect or error in the decoder can thereby be detected.

While in conventional franking machines, several mechanical roll indicators are provided, it is advantageous in the case of electronic display devices to use only one display. Several memories and a minicomputer, preferably a microprocessor MP as shown in the drawing, are used as controls. Any one of a number of well known microprocessors may be used for this purpose, such as is shown in German Published, Non-Prosecuted Application DEOS No. 30 40 549, corresponding to U.S. patent application Ser. No. 089,413, or Texas Instruments model SPB0400. In the embodiment example shown, two additional conventional NMOS-memories SP1, SP2 are provided in addition to a main RAM memory ASP and a program memory PSP. The first memory SP1 of these is exchangeable and contains, for instance, data on mechanical wear and rate limits. Data regarding the number of all printing and setting actions are stored in the second memory SP2.

In order to allow the numerical display to be checked between two franking operations if required, a program jump which causes the indication, is triggered through an operating device such as a key T, for instance, which may be part of a keyboard as shown in U.S. Pat. No. 3,226,493. The accumulated postage total, the number of prints, and the remaining available total on the "value card" can be displayed in selectable order through other similar key devices on the numerical display. The display may be provided according to element 17 of U.S. Pat. No. 3,635,297.

The brightness of the numerals of the display is further automatically adapted to the brightness of the room in order to increase the reliability of the reading. This is done by means of conventional light sensitive photo elements or opto-electronic components which are not shown in the block diagram. In such a device, shades of brightness are converted to resistance values, to lighten or darken the display, as is done in photographic exposure meters and is shown in German Published, Prosecuted Application DEAS No. 27 49 767.

The exchangeable memory SP1 contains, among other things, the limit data of the total set-in. If agreement is not reached between this data and the value setting data, the printing data, and the data regarding the number of prints, etc. of the data memory SP2, then a print inhibit DV is indicated, and is optionally coupled with a printing interlock.

The exchangeable memory SP1 further contains data regarding the mechanical wear of the printing mechanism, which is tripped electronically but set mechanically. This data concerns the denomination setting, the optional printings such as "Printed Matter" or "Registered" and the date, etc. This data, which is determined on the basis of experience data, brings about a signal S, or optionally separate signals, for each mechanical part subject to wear, if the preset number of prints is exceeded after a corresponding operating period. Upon further printing, the print inhibit DV is additionally triggered unless the memory SP1 has first been reset, for instance, after a technical check of the franking machine. The elements DV and S are signal lamps or LED's (light-emitting diodes).

To make sure that the value of the display which serves for the computation of the franking total is also printed with the same value, both values must be tested, especially since the printing operation indirectly constitutes the printing of money. After being mechanically positioned by means of the electromechanical value setter W1 for the printing mechanism or number roll Z, or by the setter W2 for the selectable printing drum WD, the settings are checked by means of an electronic setting test device ST1, ST2, independently of the electro-mechanical control. U.S. Pat. No. 3,855,041 discloses a printing roller 9 usable as the number roll Z, and a stereotype roller 10 usable as the printing drum WD. Mechanical setting devices such as those shown in FIG. 6 of U.S. Pat. No. 4,251,974 can be used as the setters W1 and W2. The electronic setting test devices ST1, ST2 are magnetic or optical reading devices which are coupled to a comparator, such as the supply reel 60, head 64 and comparator 74 shown in FIG. 4 of U.S. Pat. No. 4,024,380. The predetermined electromechanical setting of the desired value is then compared with the determined actual setting in the micro processor MP. If both settings agree, the printing is permitted. Different control features or numerals of the numerical display are associated with the different optional printing drum settings so that, for instance, the letter A or the individual numeral 2 corresponds to the setting "printed matter". In case of an error, the electromechanical setting is repeated once or several times and if the difference persists, the signal S and the print inhibit DV are released.

There are claimed:

1. Electronically controlled indicator and testing device for the denominational printing of franking machines, comprising a numerical display, a microprocessor for setting values or assigned charecteristics in said numerical display, means for sequentially visualizing all numerals in said numerical display after the franking machine is turned on, a program memory, a main memory, a data memory, and an exchangeable memory each connected to said microprocessor, a printing mechanism, a selectable option printing drum, electromechanical means cooperating with said microprocessor for setting denominations in said printing mechanism and option printing drum, electronic setting test means independent of said electro-mechanical means for comparing set values in said printing mechanism and option printing drum with said set values or assigned characteristics in said numerical display and for releasing an option print only if said set values agree, and key means for triggering an additional run of all numerals of said numerical display at any time and for sequentially reproducing said set values on said numerical display in selectable order.

2. Indicator and testing device according to claim 1, including at least one additional numerical display disposed adjacent said first-mentioned numerical display for displaying several set values simultaneously with said first-mentioned numerical display.

3. Indicator and testing device according to claim 2, wherein the brightness of said numerical displays are automatically adapted to the brightness of the surroundings.

4. Indicator and testing device according to claim 1, including a printing interlock, a signal for indicating exceeding of a preset number of prints in a given time period, and a print inhibitor, and wherein said exchangeable memory includes data on mechanical wear and rate limits and means for activating at least one of said printing interlock, signal and print inhibitor in the event of disagreement of said data with data stored in said data memory.

* * * * *